(12) United States Patent
Mackenthun

(10) Patent No.: US 6,449,322 B1
(45) Date of Patent: *Sep. 10, 2002

(54) MAXIMUM LIKELIHOOD DETECTION OF MPSK BURSTS WITH INSERTED REFERENCE SYMBOLS

(75) Inventor: Ken Mackenthun, Las Cruces, NM (US)

(73) Assignee: Stanford Telecommunications, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/330,320

(22) Filed: Jun. 10, 1999

Related U.S. Application Data

(63) Continuation-in-part of application No. 08/847,729, filed on Apr. 28, 1997, now Pat. No. 5,940,446.

(51) Int. Cl.[7] .............................................. H04L 27/22
(52) U.S. Cl. ........................ 375/329; 375/341; 329/304
(58) Field of Search .................................. 375/329–332, 375/341; 329/304

(56) References Cited

U.S. PATENT DOCUMENTS

| 5,619,167 A | | 4/1997 | Adachi ....................... 329/304 |
| 5,684,832 A | | 11/1997 | Adachi et al. ............... 375/262 |
| 5,706,313 A | | 1/1998 | Blasiak et al. ............... 375/330 |
| 5,732,114 A | | 3/1998 | Thebault et al. ............. 375/368 |
| 5,786,725 A | * | 7/1998 | Boccuzzi et al. ............ 329/304 |

OTHER PUBLICATIONS

D. Divsalara and M. K. Simon, "Multiple–Symbol Differential Detection of MPSK," *IEEE Trans. Commun.*, vol. 38, No. 3, pp. 300–308, Mar. 1990.

K. Mackenthun Jr., "A Fast Algorithm for Multiple–Symbol Differential Detection of MPSK," *IEEE Trans. Commun.*, vol. 42, No. 2/3/4, pp. 1471–1474, Feb./Mar./Apr. 1994.

M. L. Moher and J. H. Lodge, "TCMP–A Modulation and Coding Strategy for Rician Fading Channels," *IEEE J. Select. Areas Commun.*, vol. 7, Dec. 1989, pp. 1347–1355.

* cited by examiner

*Primary Examiner*—Amanda T. Le
(74) *Attorney, Agent, or Firm*—Townsend and Townsend and Crew LLP; Henry K. Woodward

(57) ABSTRACT

A fast algorithm for performing maximum likelihood detection of data symbols transmitted as phases of a carrier signal.

3 Claims, 4 Drawing Sheets

Define
$R_k = r_k$, k=1,...N
$R_{N+1} = r_{N+1}, + ... r_{N+L}$

FIG. 3A

Define
$R_k = r_k$, k=1,...N
$R_{N+1} = r_{N=1}e^{-j\text{\textcircled{H}}N+1} + ... r_{N+2}e^{-j\text{\textcircled{H}}N+L}$

FIG. 3B

MAXIMUM LIKELIHOOD DETECTION OF MPSK BURSTS WITH INSERTED REFERENCE SYMBOLS

CROSS-REFERENCES TO RELATED APPLICATIONS

This patent application is a continuation-in-part of application Ser. No. 08/847,729 filed Apr. 28, 1997, now U.S. Pat. No. 5,940,446.

BACKGROUND OF THE INVENTION

This invention relates generally to the transmission and detection of digital data using analog signals, and more particularly the invention relates to the detection of phase shift keying (PSK) encoded digital data.

The phase of a carrier signal can be used to encode digital data for transmission. The number of bits represented by a carrier phase symbol depends on the number of phases M of the carrier in an MPSK data burst.

A prior art approach to the detection of data symbols consists of using a phase locked loop to lock to the reference symbols and then detecting the data symbols using the phase reference out of the loop. A related approach is to use both reference symbols and remodulated data symbols to obtain a loop phase reference. These approaches are well known.

Another approach is to form a phase reference using a filtering operation on the reference symbols, often called pilot symbol aided demodulation. This approach is essentially the same as the phase locked loop approach in the sense that the phase locked loop also performs a filtering operation.

The present invention is concerned with maximum likelihood detection of data symbols in an MPSK data burst with inserted reference symbols.

SUMMARY AND DESCRIPTION OF THE DRAWINGS

The present invention presents a fast algorithm to perform maximum likelihood detection of data symbols. The figures of the drawings (FIGS. 1A, 1B, 2, 3A, 3B) illustrate flow diagrams of four embodiments in implementing algorithm.

DETAILED DESCRIPTION OF THE INVENTION

First consider a specific problem which however has all the essential features of the general problem. Consider that N data symbols $s_1, s_2, \ldots s_N$ are transmitted at times $1, 2, \ldots N$, and that a reference symbol $s_{N+1}$ is transmitted at time $N+1$. All $N+1$ symbols are MPSK symbols, that is, for $k=1, \ldots N$, $s_k = e^{j\phi k}$, where $\phi k$ is a uniformly distributed random phase taking values in $\{0, 2\pi/M, \ldots 2\pi(M-1)/M\}$, and for $k=N+1$, reference symbol $s_{N+1}$ is the MPSK symbol $e^{j0}=1$. The $N+1$ symbols are transmitted over an AWGN (Additive white Gaussian noise) channel with unknown phase, modeled by the equation:

$$r = s_e^{j\Theta} + n. \quad (1)$$

where r, s, and n are $N+1$ length sequences whose $k^{th}$ components are $r_k$, $s_k$, and $n_k$, respectively, $k=1, \ldots N+1$. Further, n is the noise sequence of independent noise samples, r is the received sequence, and $\theta$ is an unknown channel phase, assumed uniformly distributed on $(-\pi, \pi]$.

We now give the maximum likelihood decision rule to recover the data $s_1, \ldots s_N$. For the moment, first consider the problem where we want to recover $s = s_1, \ldots s_{N+1}$, where $s_{N+1}$ is assumed to be unknown. We know that the maximum likelihood rule to recover s is the s which maximizes $p(r|s)$. From previous work, we know that this is equivalent to finding the s which maximizes $\eta(s)$, where:

$$\eta(s) = \left| \sum_{k=1}^{N+1} r_k s_k^* \right|^2. \quad (2)$$

In general, there are M solutions to (2). The M solutions only differ by the fact that any two solutions are a phase shift of one another by some multiple of $2\pi/M$ modulo $2\pi$. Now return to the original problem which is to recover the data $s_1 \ldots s_N$. The maximum likelihood estimate of $s_1, \ldots s_N$ must be the first N components of the unique one of the M solutions of (2) whose $s_{N+1}$ component is $e^{j0}=1$.

An algorithm to maximize (2) when all $s_k$, $k=1, \ldots N+1$ are unknown and differentially encoded is given in K. Mackenthun Jr., "A fast algorithm for multiple-symbol differential detection of MPSK", *IEEE Trans. Commun.*, vol 42, no. 2/3/4, pp. 1471–1474, February/March/April 1994. Therefore to find the maximum likelihood estimate of $s_1, \ldots s_N$ when $s_{N+1}$ is a reference symbol, we only need to modify the algorithm for the case when $s_{N+1}$ is known.

The modified algorithm to find the maximum likelihood estimate $\hat{s}_1, \ldots \hat{s}_N$ of $s_1, \ldots s_N$ is as follows. Let $\Phi$ be the phase vector $\Phi = (\phi_1, \ldots \phi_{N+1})$, where all $\phi_k$ can take arbitrary values, including $\phi_{N+1}$. If $|r_k|=0$, arbitrary choice of $s_k$ will maximize (2). Therefore, we may assume with no loss in generality that $|r_k|>0$, $k=1, \ldots N$. For a complex number $\gamma$, let $\arg[\gamma]$ be the angle of $\gamma$.

Let $\hat{\Phi} = (\tilde{\Phi}_1, \ldots \tilde{\Phi}_{N+1})$ be the unique $\Phi$ for which:

$$\arg[r_k e^{-j\psi_k}] \in [0, 2\pi/M),$$

for $k=1, \ldots N+1$. Define $z_k$ by:

$$z_k = r_k e^{-j\tilde{\psi}_k}. \quad (3)$$

For each k, $k=1, \ldots N+1$, calculate $\arg[z_k]$. List the values $\arg[z_k]$ in order, from largest to smallest. Define the function $k(i)$ as giving the subscript k of $z_k$ for the $i^{th}$ list position, $i=1, \ldots N+1$. Thus, we have:

$$0 \le \arg[z_{k(N+1)}] \le \arg[z_{k(N)}] \le \ldots \le \arg[z_{k(1)}] < \frac{2\pi}{M}. \quad (4)$$

For $i=1, \ldots N+1$, let:

$$g_i = zk(i). \quad (5)$$

For i satisfying $N+1 < i \le 2(N+1)$, define:

$$g_i = e^{-j2\pi j2} g_{i-(N+1)}. \quad (6)$$

Calculate:

$$\left| \sum_{i=q}^{q+N} g_i \right|^2, \text{ for } q = 1, \ldots N+1, \quad (7)$$

and select the largest.

Suppose the largest magnitude in (7) occurs for q=q'. We now find the phase vector $\tilde{\Phi}$ corresponding to q=q'. Using (3), (5), and (6), with i in the range of q'≦i≦q'+N, we have:

$$\tilde{\varphi}_{k(i)} = \tilde{\varphi}_{k(i)}, q' \leq i \leq N+1 \tag{8}$$

$$\tilde{\varphi}_{k(i-N)} = \tilde{\varphi}_{k(i-[N+1])} + \frac{2\pi}{M}), N+1 < i \leq q'+N. \tag{9}$$

The evaluation of (8) and (9) gives elements $\tilde{\Phi}_{k(l)}$, l=1, ... N+1, in order of subscript value k(1), by arranging the elements $\tilde{\Phi}_{k(l)}$, l=1, ... N+1 in order of subscript value k(l), we form the sequence $\tilde{\Phi}_1, \tilde{\Phi}_2, \ldots \tilde{\Phi}_{N+1}$, which is the vector $\tilde{\Phi}$. The maximum likelihood estimate of $\hat{s}_1, \ldots \hat{s}_N$ is now given by $\hat{s}_k e^{j\hat{\phi}k}$, ... k=1, ... N, where $\hat{\phi}_k = \tilde{\Phi}_k - \tilde{\Phi}_{N+1}$, k=1, ... N.

As discussed in Mackenthun supra, algorithm complexity is essentially the complexity of sorting to obtain (4), which is (N+1)log(N+1) operations.

We now expand the specific problem considered earlier to a more general problem. Suppose that N data symbols are transmitted followed by L reference symbols $s_{N+1}, \ldots s_{N+L}$, where $s_k = e^{j0} = 1$ for k=N+1, ... N+L, and assume the definition of channel model (1) is expanded so that r, s, and n are N+L length sequences. Then in place of (2) we have:

$$\eta(s) = \left| \sum_{k=1}^{N+L} r_k s_k^* \right|^2. \tag{10}$$

However, note that (10) can be rewritten as:

$$\eta(s) = \left| \sum_{k=1}^{N} r_k s_k^* + r'_{N+1} s_{N+1}^* \right|^2 \tag{11}$$

where $r'_{N+1} = r_{N+1} + r_{N+2} + \ldots r_{N+L}$. But we can apply the previous modified algorithm exactly to (11) and thereby obtain a maximum likelihood estimate of the first N data symbols.

Now suppose the L reference symbols can take values other than $e^{j0}$. Since the reference symbols are known to the receiver, we can remodulate them to $e^{j0}$ and then obtain a result in the form (11), and apply the previous algorithm. Finally, suppose the L reference symbols are scattered throughout the data. It is clear that we can still obtain a result in the form (11) and apply the previous algorithm.

If desired, sorting can be avoided at the expense of an increase in complexity in the following way. Fix j, j∈{1, ... N+1}. For k=1, ... N+1, form $r_j^* r_k$ and let $g_{j,k}$ be the remodulation of $r_j^* r_k$ such that $g_{j,k} \in \{0, 2\pi/M\}$. Now note that the set in (7) is the same as the set:

$$\left| \sum_{k=1}^{N+1} g_{j,k} \right|^2, \text{ for } j = 1, \ldots N+1. \tag{12}$$

Thus, sorting has been eliminated but forming the above set requires (N+1)² complex multiplications.

The drawing figures illustrate flow diagrams of four embodiments in implementing the algorithm. The flow chart of FIGS. 1A, 1B can be implemented in a DSP chip, ASIC chip, or general purpose computer. The first embodiment takes N MPSK data symbols and one reference symbol, of value $e^{j0}=1$, as input, and produces a maximum likelihood estimate of the N data symbols as output. The complexity of the first embodiment is roughly N log N.

FIGS. 3A and 3B are used with FIGS. 1 and 2 to show different embodiments of the invention, which also form maximum likelihood estimates of the N data symbols, but which allow for multiple reference symbols, of arbitrary MPSK values, inserted among the data symbols at arbitrary positions.

FIRST EMBODIMENT OF THE INVENTION

Consider that N data symbols $s_1, s_2, \ldots s_N$ are transmitted at times 1,2 ... N, and that a reference symbol $s_{N+1}$ is transmitted at time N+1. All N+1 symbols are MPSK symbols, that is, for k=1, ... N, $s_k = e_{j\phi k}$, where $\phi_k$ is a uniformly random phase taking values in {0,2π/M, ... 2π(M-1)/M}, and for k=N+1, reference symbol $s_{N+1}$ is the MPSK symbol $e^{j0}=1$. The N+1 symbols are transmitted over an AWGN channel with unknown phase, modeled by the equation (eqn. 1):

$$r = se^{j\theta} + n \tag{13}$$

where r, s, and n are N+1 length sequences whose $k^{th}$ components are $r_k$, $s_k$, and $n_k$, respectively, k=1, ... N+1. Further, n is the noise sequence of independent noise samples, r is the received sequence, and θ is an unknown channel phase, assumed uniformly distributed on (-π, π].

We now give the maximum likelihood decision rule to recover the data $s_1, \ldots s_N$. For the moment, first consider the problem where we want to recover $s=s_1, \ldots s_{N+1}$, where $s_{N+1}$ is assumed to be unknown. We know that the maximum likelihood rule to recover s is the s which maximizes p(r|s). From previous work, we know that this is equivalent to finding the s which maximizes η(s), where $$\eta(s) = \left| \sum_{k=1}^{N+1} r_k s_k^* \right|^2. \tag{14}$$

In general, there are M solutions to (14). The M solutions only differ by the fact that any two solutions are a phase shift of one another by some multiple of 2π/M modulo 2π. Now return to the original problem which is to recover the unknown data $s_1, \ldots s_N$ with $s_{N+1} = e^{j0} = 1$. The maximum likelihood estimate of $s_1, \ldots s_N$ must be the first N components of the unique one of the M solutions of (14) whose $s_{N+1}$ component is $e^{j0}=1$.

An algorithm to maximize (14) when all $s_k$, k=1, ... N+1 are unknown and differentially encoded is known. Therefore, to find the maximum likelihood estimate of $s_1, \ldots s_N$ when $s_{N+1}$ is a reference symbol, we only need to modify the algorithm for the case when $s_{N+1}$ is known.

Figure 1A:
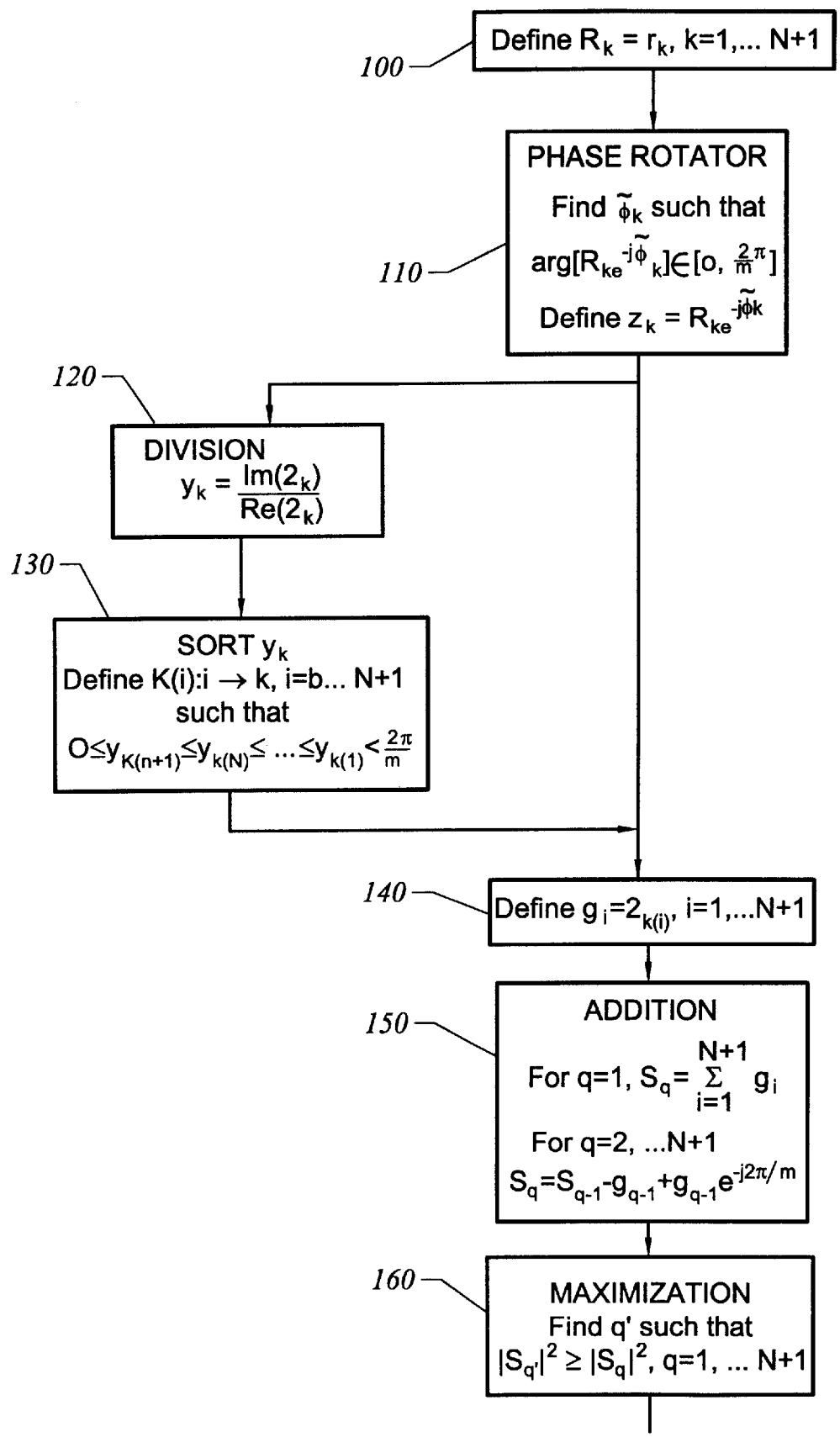
Figure 1B:
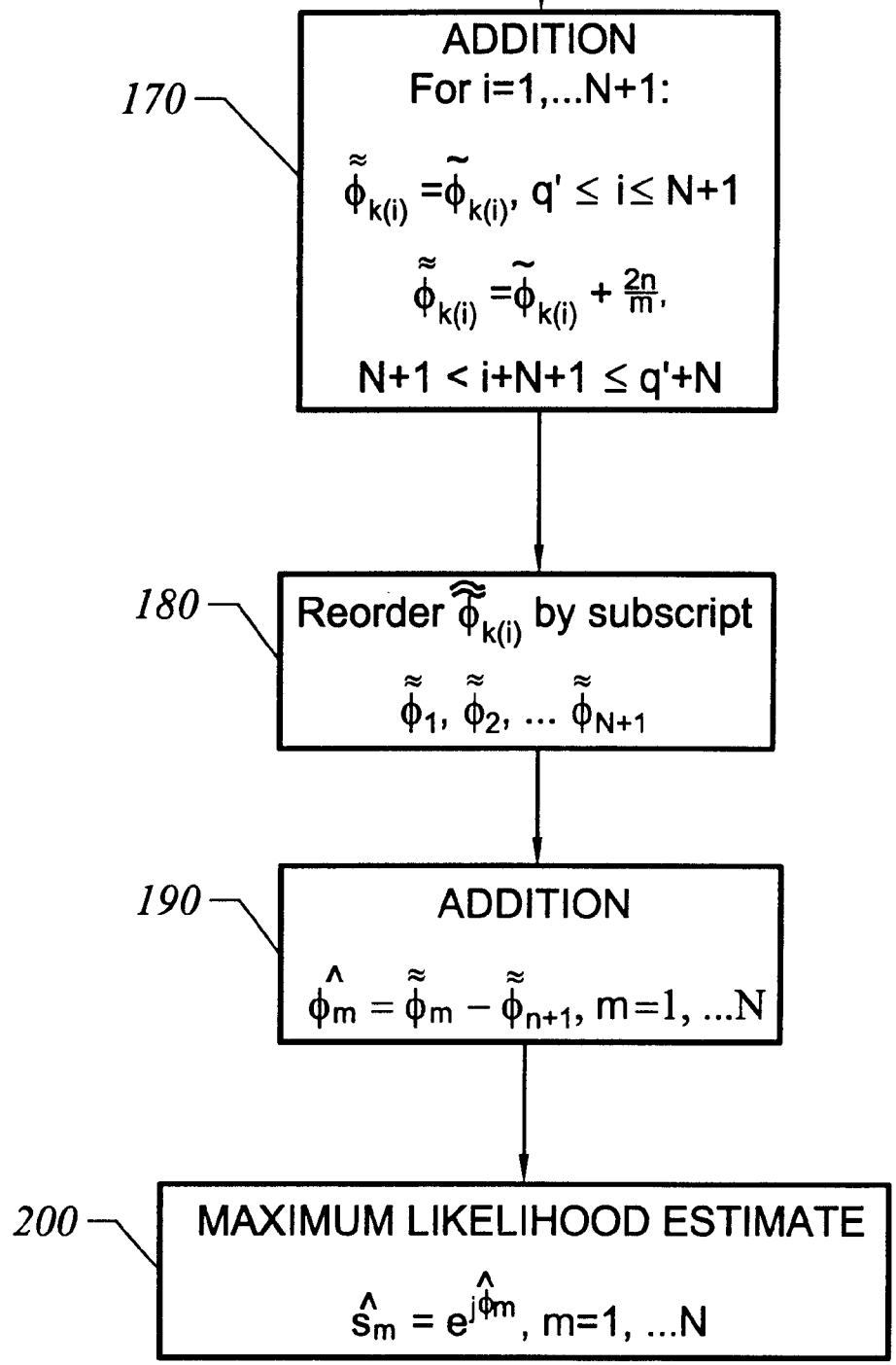

The modified algorithm to find the maximum likelihood estimate $\hat{s}_1, \ldots \hat{s}_N$ of $s_1, \ldots s_N$, and the first embodiment of the present invention, is as follows. Define $R_k = r_k$, k=1, ... N+1. Refer to FIG. 1. The present invention consists of:

a. an input 100 of $R_k$, k=1, ... N+1, where $R_k$, k=1, ... N, are unknown MPSK data symbols $s_k$ plus added white Gaussian noise, and $R_{N+1}$ is a known reference symbol $e^{j0}=1$ plus added white Gaussian noise.

b. a phase rotator 110 which finds the angle $\phi_k$, $\phi_k \in \{0, 2\pi/M, \ldots 2\pi(M-1)\}$, such that $$\arg[R_k e^{-j\phi k}] \in [0, 2\pi/M), \tag{15}$$

for k=1, ... N+1, where arg[γ] is the angle of the complex number γ. If $R_k=0$, we may assume that $\phi_k=0$. At the output of the phase rotator, we define $$z_k = R_k e^{-j\phi k}. \tag{16}$$

c. a division circuit 120 which forms $y_k=\text{Im}(z_k)/\text{Re}(z_k)$, for k=1, . . . N+1.

d. a sorting operation of circuit 130 which orders $y_k$ from largest to smallest, by the index i, i=1, . . . N+1. Define the function k(i) as giving the subscript k of $y_k$ for the $i^{th}$ list position, i=1, . . . N+1. Thus, we have $$0 \le y_{k(N+1)} \le y_{k(N)} \le \ldots \le y_{k(1)} < \frac{2\pi}{M}. \tag{17}$$

e. using the function k(i), a circuit 140 reorders $z_k$ by defining $$g_i = z_{k(i)}, \tag{18}$$

for i=1, . . . N+1.

f. an addition circuit 150 which forms sums $S_q$, q=1, . . . N+1, where $$S_1 = \sum_{i=1}^{N+1} g_i, \tag{19}$$

and $$S_q = S_{q-1} - g_{q-1} + g_{q-1} e^{-j2\pi/M},$$

for q=1, . . . N+1.

g. a squaring and maximization circuit 160 which finds $q' \in \{1 \ldots N+1\}$ such that $$|S_{q'}|^2 \ge |S_q|^2,$$

for q=1, . . . N+1.

h. an addition circuit 170 which forms phases $\tilde{\varphi}_{k(i)}$ for i=1, . . . N+1, defined by $$\tilde{\varphi}_{k(i)} = \tilde{\varphi}_{k(i)}, q' \le i \le N+1 \tag{20}$$

$$\tilde{\varphi}_{k(i)} = \tilde{\varphi}_{k(i)} + \frac{2\pi}{M}, N+1 < i + N + 1 \le q' + N. \tag{21}$$

i. a circuit 180 which reorders $\tilde{\varphi}_{k(i)}$ by subscript value to form $\tilde{\varphi}_1, \tilde{\varphi}_2, \ldots \tilde{\varphi}_{N+1}$.

j. an addition circuit 190 which forms phases $\tilde{\varphi}_m$, m=1, . . . N, defined by $$\hat{\varphi}_m = \tilde{\varphi}_m - \tilde{\varphi}_{N+1}. \tag{22}$$

k. a final circuit 200 which forms a maximum likelihood estimate $\hat{s}_m$ of $s_m$ for m=1, . . . N, where $\hat{s}_m = e^{j\hat{\varphi}m}$.

SECOND EMBODIMENT OF INVENTION

In the second embodiment of the invention, we modify the first embodiment to eliminate sorting, but the implementation complexity increases from roughly N log N to $N^2$.

Figure 2:
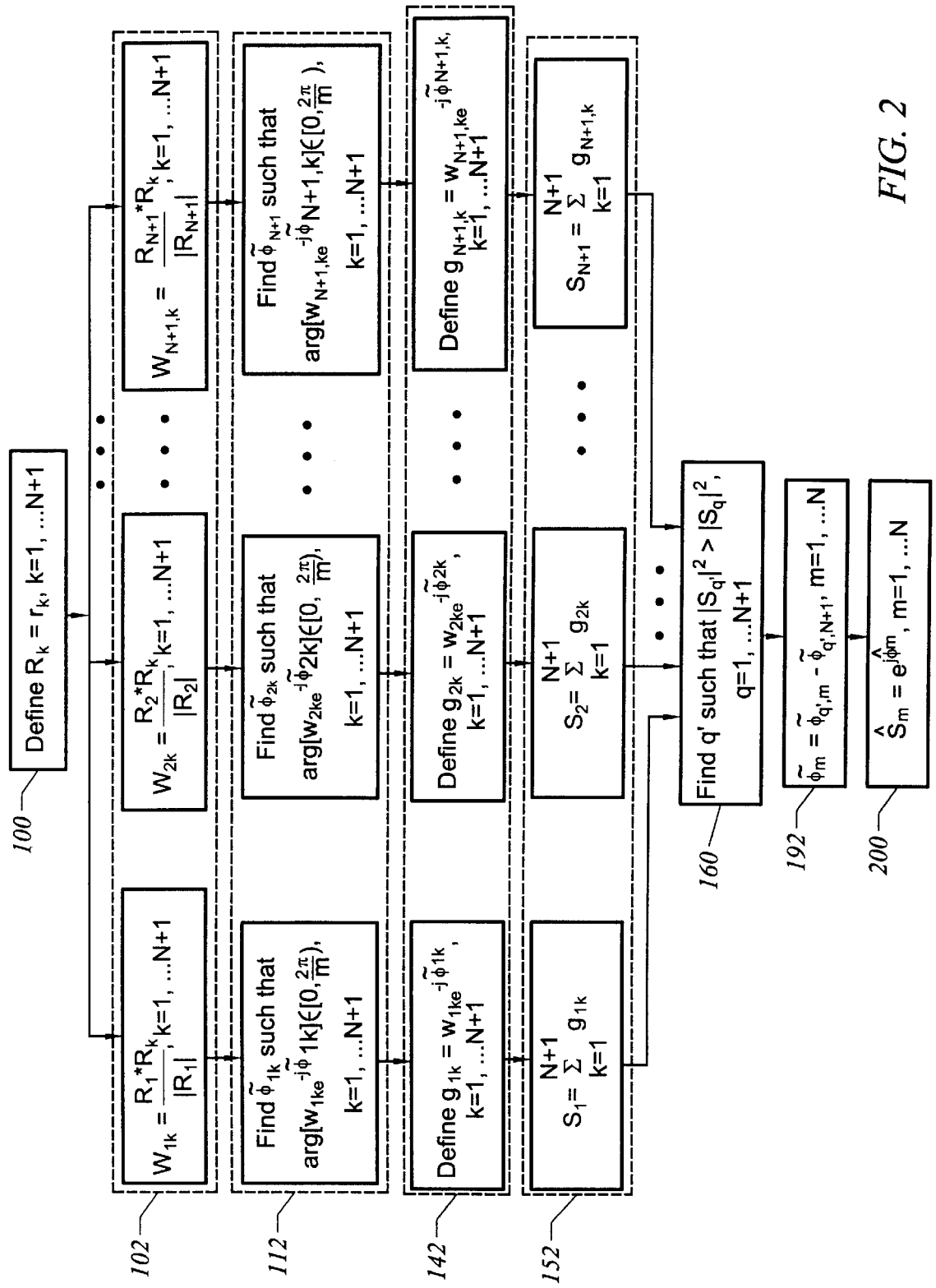
FIG. 2 is a second embodiment of the invention, which also takes N MPSK data symbols and one reference symbol, of value $e^{j0}=1$, as input, and produces a maximum likelihood estimate of the N data symbols as output; however, the second embodiment uses a different implementation of complexity roughly $N^2$.

Define $R_k = r_k$, k=1, . . . N+1. Refer to FIG. 2. The second embodiment of the present invention consists of a. an input 100 of $R_k$, k=1, . . . N, where $R_k$, k=1, . . . N, are unknown MPSK data symbols $s_k$ plus added white Gaussian noise, and $R_{N+1}$ is a known reference symbol $e^{j0}=1$ plus added white Gaussian noise.

b. a set of N+1 parallel phase rotators 102, where the $q^{th}$ phase rotator, q=1, . . . N+1, forms $$w_{qk} = \frac{R_q^* R_k}{|R_q|}, \tag{23}$$

for k=1, . . . N+1.

c. a set of N+1 parallel phase rotators 112, where the $q^{th}$ phase rotator, q=1, . . . N+1, finds the angle $\phi_{qk}$, $\phi_{qk} \in \{0, 2\pi/M, \ldots 2\pi(M-1)/M\}$, such that $$\arg[w_{qk} e^{-j\phi_{qk}}] \in [0, 2\pi 0,), \tag{24}$$

for k=1, . . . N+1. As before, arg[γ] is the angle of the complex number γ, and if $w_{qk}=0$, we may assume that $\hat{\phi}_{qk}=0$.

d. a set of N+1 parallel circuits 142, where the $q^{th}$ circuit, q=1, . . . N+1, defines $g_{qk}$ by $$g_{qk} = w_{qk} e^{-j\hat{\varphi}_{qk}}, \tag{25}$$

for k=1, . . . N+1.

e. a set of N+1 parallel circuits 152, where the qth circuit, q'=1, . . . N+1, forms a sum $S_q$, $$S_q = \sum_{k=1}^{N+1} g_{qk}. \tag{26}$$

f. a squaring and maximization circuit 160 which finds $q' \in \{1, \ldots N+1\}$ such that $$|S_{q'}|^2 \ge |S_q|^2, \tag{27}$$

for q=1, . . . N+1.

g. an addition circuit 192 which forms phases $\tilde{\varphi}_m$, m=1, . . . N, defined by $$\tilde{\varphi}_m = \hat{\phi}_{q',m} - \hat{\phi}_{q',N+1}. \tag{28}$$

h. a final circuit 200 which forms a maximum likelihood estimate $\hat{s}_m$ of $s_m$ for m=1, . . . N, where $\hat{s}_m = e_{j\hat{\varphi}_m}$.

THIRD AND FOURTH EMBODIMENTS OF INVENTION

Now suppose that N data symbols are transmitted followed by L reference symbols $s_{N+1}, s_{N+L}$, where $s_k = e^{j0} = 1$ for k=N+1, . . . N+L. Suppose the L reference symbols are received over the previously defined additive white Gaussian channel as $r_{N+1}, \ldots r_{N+L}$. Then we can still use the first and second embodiment of the invention to derive maximum likelihood estimates of $s_1, \ldots s_N$ if the input box 100 in FIGS. 1A and 2 is replaced by input box 100 shown in FIG. 3A. For the third embodiment, replace 100 in FIG. 1 with 100 in FIG. 3A; for the fourth embodiment, replace 100 in FIG. 2 with 100 in FIG. 3A.

FIFTH AND SIXTH EMBODIMENTS OF INVENTION

Now suppose that N data symbols are transmitted followed by L reference symbols $s_{n+1}, \ldots s_{N+L}$, where the L reference symbols are modulated to arbitrary but known MPSK values, such that $s_k = e^{j\Theta_k}$ for $s_k = e^{j\Theta_k}$ for k=N+1, . . . N+L. Suppose the L reference symbols are received over the previously defined additive white Gaussian channel as $r_{N+1}, \ldots r_{N+L}$. Then we can still use the first and second embodiment of the invention to derive maximum likelihood estimates of $s_1, \ldots s_N$ if the input box 100 in FIGS. 1 and 2 is replaced by input box 100 shown in FIG. 3b, that is, if $R_{N+1}$ is redefined as $$R_{N+1} = r_{N+1} e^{-j\Theta_{N+1}} + \ldots r_{N+L} e^{-j\Theta_{N+L}} \tag{29}$$

For the fifth embodiment, replace 100 in FIG. 1 with 100 in FIG. 3a; for the sixth embodiment, replace 100 in FIG. 2 with 100 in FIG. 3a.

SEVENTH AND EIGHTH EMBODIMENTS OF THE INVENTION

Now suppose that N data symbols are transmitted along with L reference symbols which are modulated to arbitrary but known MPSK values, and that the reference symbols are inserted among the data symbols at arbitrary positions. Frequently, the reference symbols are periodically inserted. It is clear from the assumption of the additive white Gaussian noise channel that we can reindex the data symbols from 1 to N and reindex the reference symbols from N+1 to N+L, and then use the fifth and sixth embodiment of the invention to obtain a maximum likelihood estimate of the data symbols, giving the seventh and eighth embodiments of the invention, respectively.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of maximum likelihood detection of data symbols in an MPSK data burst comprising the steps of:

(a) identifying N MPSK data symbols $s_1, s_2, \ldots s_N$ at times $1, 2, \ldots N$ along with at least one reference symbol $s_{N+1}$ at time N+1, where $s_k = e^{j\psi_k}$ for $k=1, \ldots N$, and $\phi_k$ is uniformly distributed random phase taking values in $\{0, 2\pi/M, \ldots 2\pi(M-1)/M\}$, and for k=N+1, reference symbol $s_{N+1}$ is an MPSK symbol $e^{j0}=1$;

(b) transmitting said N MPSK symbols over an AWGN channel with unknown phase and modeled as $r = se^{j\Theta} + n$, where r, s, and n are N+1 length sequences whose $k^{th}$ components are $r_k$, $s_k$, and $n_k$, $k=1, \ldots N+1$; and (c) finding s which maximized $\eta(s)$, where:

$$\eta(s) = \left| \sum_{k=1}^{N} r_k s_k^* + r'_{N+1} s_{N+1}^* \right|^2,$$

(c1) defining $\Phi$ as the phase vector $\Phi = (\phi_1, \ldots \phi_{N+1})$ and $|r_k| > 0$, $k=1, \ldots N$, and for a complex number of $\gamma$, let arg[$\gamma$] be the angle of $\gamma$;

(c2) let $\Phi = (\phi_1, \ldots \phi_{N+1})$ be the unique $\Phi$ for which $$\arg[r_k e^{-j\phi_k}] \in [0, 2\pi M)$$

for $k=1, \ldots N+1$ and $$z_k r_k e^{-j\psi_k};$$

(c3) for each k, $k=1, \ldots N+1$, calculate arg($z_k$), and reorder values from largest to smallest, (c4) define a function k(i) as giving a subscript k of $z_k$ for the $i^{th}$ list position, $i=1, \ldots N+1$ whereby:

$$0 \leq \arg[z_{k(N+1)}] \leq \arg[z_{k(N)}] \leq \ldots \leq \arg[z_{k(1)}] < \frac{2\pi}{M};$$

(c5) for $i=1, \ldots N+1$, let $$g_i = z_{k(i)},$$

and for i satisfying $N+1 < i \leq 2N+1$, define:

$$g_i = e^{-j2\pi/M} g_{i-(N+1)};$$

and (c6) calculate:

$$\left| \sum_{i=q}^{q+N} g_i \right|^2, \text{ for } q=1, \ldots N+1; \text{ and}$$

(c7) select the largest value in step (c6).

2. A method of maximum likelihood detection of data symbols in an MPSK data burst comprising the steps of:

(a) identifying N MPSK data symbols $s_1, s_2, \ldots s_N$ at times $1, 2, \ldots N$ along with at least one reference symbol $s_{N+1}$ at time N+1, where $s_k = e^{j\psi_k}$ for $k=1, \ldots N$, and $\phi_k$ is uniformly distributed random phase taking values in $\{0, 2\pi/M, \ldots 2\pi(M-1)M\}$, and for k=N+1, reference symbol $s_{N+1}$ is an MPSK symbol $e^{j0}=1$;

(b) transmitting said N MPSK symbols over an AWGN channel with unknown phase and modeled as $r = se^{j\psi} + n$, where r, s, and n are N+1 length sequences whose $k^{th}$ components are $r_k$, $s_k$, and $n_k$, $k=1, \ldots N+1$; and (c) finding s which maximized $\eta(s)$, where:

$$\eta(s) = \left| \sum_{k=1}^{N} r_k s_k^* + r'_{N+1} s_{N+1}^* \right|^2,$$

where $R_{N+1} = r_{N+1} + r_{N+2} + \ldots r_{N+L}$, and L=number of reference symbols, where step (c) is implemented by:

(c1) a division circuit 120 which forms $y_k = \text{Im}(z_k)/\text{Re}(z_k)$, for $k=1, \ldots N+1$, (c2) a sorting operation of circuit 130 which orders $y_k$ from largest to smallest, define the function k(i) as giving the subscript k of $y_k$ for the $i^{th}$ list position, $i=1, \ldots N+1$. Thus, we have $$0 \leq y_{k(N+1)} \leq y_{k(n)} \leq \ldots \leq y_{k(1)} < \frac{2\pi}{M}.$$

(c3) using the function k(i), a reordering circuit which reorders $z_k$ by defining $$g_i = z_{k(i)},$$

for $i=1, \ldots N+1$, (c4) an addition circuit which forms sums $S_q$, $q=1, \ldots N+1$, where $$S_1 = \sum_{i=1}^{N+1} g_i,$$

and $$S_q = S_{q-1} - g_{q-1} + g_{q-1} e^{-j2\pi/M},$$

for $q=1, \ldots N+1$, (c5) a squaring and maximization circuit which finds $q' \in \{1m \ldots B+1\}$ such that $$|S_{q'}|^2 \geq |S_q|^2.$$

for $q=1, \ldots N+1$, (c6) an addition circuit which forms phases $\tilde{\tilde{\phi}}_{k(i)}$ for $i=1, \ldots N+1$, defined by $$\tilde{\tilde{\phi}}_{k(i)} = \tilde{\phi}_{k(i)}, q'' \leq i \leq N+1$$

$$\tilde{\tilde{\phi}}_{k(i)} = \tilde{\phi}_{k(i)} + \frac{2\pi}{M}, N+1 < i+N+1 \leq q'+N.$$

(c7) a circuit which reorders $\tilde{\tilde{\phi}}_{k(i)}$ by subscript value to form $\tilde{\tilde{\phi}}_1, \tilde{\tilde{\phi}}_2, \ldots \tilde{\tilde{\phi}}_{N+1}$.

(c8) an addition circuit which forms phases $\hat{\phi}_m$, $m=1, \ldots N$, defined by $$\hat{\phi}_m = \tilde{\tilde{\phi}}_m - \tilde{\tilde{\phi}}_{N+1}.$$

(c9) a final circuit which forms a maximum likelihood estimate $\hat{s}_m$ of $s_m$ for $m=1, \ldots N$, where $\hat{s}_m e^{j\hat{\phi}m}$.

3. A method of maximum likelihood detection of data symbols in an MPSK data burst comprising the steps of:

(a) identifying N MPSK data symbols $s_1, s_2, \ldots s_N$ at times $1, 2, \ldots N$ along with at least one reference symbol $s_{N+1}$ at time $N+1$, where $s_k = e^{j\psi k}$ for $k=1, \ldots N$, and $\phi_k$ is uniformly distributed random phase taking values in $\{0, 2\pi/M, \ldots 2\pi(M-1)/M\}$, and for $k=N+1$, reference symbol $s_{N+1}$ is an MPSK symbol $e^{j\Phi-1}$;

(b) transmitting said N MPSK symbols over an AWGN channel with unknown phase and modeled as $r = se^{j\Theta} + n$, where $r$, $s$, and $n$ are $N+1$ length sequences whose $k^{th}$ components are $r_k$, $s_k$, and $n_k$, $k=1, \ldots N+1$; and (c) finding $s$ which maximized $\eta(s)$, where:

$$\eta(s) = \left| \sum_{k=1}^{N} r_k s_k^* + r'_{N+1} s_{N+1}^* \right|^2,$$

where $R_{N+1} = r_{N+1} + r_{N+2} + \ldots r_{N+L}$, and L=number of reference symbols, where step (c) is implemented by:

(c1) a set of N+1 parallel phase rotators, where the $q^{th}$ phase rotator, $q=1, \ldots N+1$, forms $$w_{qk} = \frac{R_q^* R_k}{|R_q|},$$

for $k=1, \ldots N+1$, (c2) a set of N+1 parallel phase rotators, where the $q^{th}$ phase rotator, $q=1, \ldots N+1$, finds the angle $\phi_{qk}$, $\phi_{qk} \in \{0, 2\pi/M, \ldots 2\pi(M-1)/M\}$, such that $$\arg[w_{qk} e^{-j\phi_{qk}}] \in [0, 2\pi 0, 2,$$

for $k=1, \ldots N+1$, As before, $\arg[\gamma]$ is the angle of the complex number $\gamma$, and if $w_{qk}=0$, we may assume that $\phi_{qk}=0$, (c3) a set of N+1 parallel circuits, where the $q^{th}$ circuit, $q=1, \ldots N+1$, defines $g_{qk}$ by $$g_{qk} = w_{qk} e^{-j\phi_{qk}},$$

for $k=1, \ldots N+1$, (c4) a set of N+1 parallel circuits, where the $q^{th}$ circuit, $q=1, \ldots N+1$, forms a sum $S_q$, $$S_q = \sum_{k=1}^{N+1} g_{qk}.$$

(c5) a squaring and maximization circuit which finds $q' \in \{1, \ldots N+1\}$ such that $$|S_{q'}|^2 \geq |S_q|^2,$$

for $q=1, \ldots N+1$, (c6) an addition circuit which forms phases $\psi_m, m=1, \ldots N$, defined by $$\psi_m = \phi_{q',m} - \phi_{q',N+1}.$$

(c7) a final circuit which forms a maximum likelihood estimate $\hat{s}_m$ of $s_m$ for $m=1, \ldots N$, where $\hat{s} = e^{j\psi m}$.

* * * * *